United States Patent
Walsh

(10) Patent No.: US 12,522,274 B2
(45) Date of Patent: Jan. 13, 2026

(54) DEVICE, SYSTEM AND METHOD FOR TRANSPORTING OBJECTS OVER LOOSE TERRAIN

(71) Applicant: Coast4Life LLC., Ronkonkoma, NY (US)

(72) Inventor: Christopher Walsh, Kings Park, NY (US)

(73) Assignee: Coast4Life LLC., Ronkonkoma, NY (US)

( * ) Notice: Subject to any disclaimer, the term of this patent is extended or adjusted under 35 U.S.C. 154(b) by 314 days.

(21) Appl. No.: 18/446,613

(22) Filed: Aug. 9, 2023

(65) Prior Publication Data
US 2024/0124045 A1    Apr. 18, 2024

Related U.S. Application Data

(60) Provisional application No. 63/415,400, filed on Oct. 12, 2022.

(51) Int. Cl.
*B62B 19/02* (2006.01)

(52) U.S. Cl.
CPC .................... *B62B 19/02* (2013.01)

(58) Field of Classification Search
CPC ....... A63C 2203/06; A63C 11/10; A63C 5/16; A63C 5/085; A63C 11/026; B62B 15/008; B62B 19/02; B62B 9/04; B62B 13/16; B62B 15/009; B62B 17/02; B62B 2205/00; B62B 2206/00; B62B 2206/006; B62B 15/002
See application file for complete search history.

(56) References Cited

U.S. PATENT DOCUMENTS

| | | | | |
|---|---|---|---|---|
| 426,450 | A | * 4/1890 | Hurd | B62B 19/02 280/13 |
| 910,206 | A | 1/1909 | Karssen | |
| 1,284,460 | A | 11/1918 | Ross | |
| 2,429,737 | A | * 10/1947 | Willenberg | B62B 19/02 172/246 |
| 2,598,682 | A | 6/1952 | Giovannoni | |

(Continued)

FOREIGN PATENT DOCUMENTS

| | | |
|---|---|---|
| CN | 101927780 A * | 12/2010 |
| CN | 3235302 U | 12/2021 |

(Continued)

OTHER PUBLICATIONS

CN-101927780-A English Translation (Year: 2010).*

*Primary Examiner* — Michael T. Walsh
(74) *Attorney, Agent, or Firm* — Dilworth & Barrese, LLP

(57) ABSTRACT

Devices, systems and methods for converting wheeled carriers into sliding carriers include at least one sliding member positioned under at least one wheel of a wheeled carrier such as a wagon. The sliding member includes an abutment against which the wheel rests such that when the wheeled carrier is in motion, namely pushed or pulled, the abutment is likewise pushed or pulled, thereby retaining the sliding member(s) under the wheel(s) and transporting the wheeled carrier without significant wheel rotation. In this manner a wheeled carrier can slide on loose terrain such as sand. The device can also be used to slide objects other than wheeled carriers.

19 Claims, 19 Drawing Sheets

(56) References Cited

U.S. PATENT DOCUMENTS

| | | | | |
|---|---|---|---|---|
| 3,070,383 | A * | 12/1962 | Roe | B62B 19/02 |
| | | | | 280/13 |
| 3,367,674 | A * | 2/1968 | Puhl | B62B 19/02 |
| | | | | 280/13 |
| 3,720,421 | A * | 3/1973 | Clemmer | A63C 5/062 |
| | | | | 280/601 |
| 3,774,926 | A | 11/1973 | Chase | |
| 4,194,753 | A | 3/1980 | Schrishuhn, Jr. | |
| 4,577,876 | A | 3/1986 | Harris | |
| 4,778,190 | A | 10/1988 | Meredith | |
| 5,427,390 | A | 6/1995 | Duncan et al. | |
| 6,408,962 | B1 * | 6/2002 | Ryckman | B62B 15/007 |
| | | | | 180/9.22 |
| 8,418,792 | B2 * | 4/2013 | Rivard | B62K 5/01 |
| | | | | 280/8 |
| 8,641,055 | B2 * | 2/2014 | Simmons | B62B 17/02 |
| | | | | 280/22 |
| 9,340,224 | B2 | 5/2016 | Yoder et al. | |
| 2003/0034619 | A1 * | 2/2003 | Bergstrom | B62D 57/00 |
| | | | | 280/28 |
| 2006/0049588 | A1 * | 3/2006 | Twitchell | B62B 13/125 |
| | | | | 280/16 |
| 2015/0084291 | A1 | 3/2015 | Yoder et al. | |

FOREIGN PATENT DOCUMENTS

| | | | |
|---|---|---|---|
| JP | 2011126458 | A | 6/2011 |
| JP | 7117854 | B2 | 8/2018 |
| RU | 135607 | U1 | 12/2013 |

* cited by examiner

DEVICE, SYSTEM AND METHOD FOR TRANSPORTING OBJECTS OVER LOOSE TERRAIN

CROSS-REFERENCE TO RELATED APPLICATIONS

This application claims the benefit of U.S. Provisional Patent Application Ser. No. 63/415,400 entitled BEACH WAGON TO SLED CONVERTER, which was filed Oct. 12, 2022. The aforementioned application is incorporated by reference in its entirety in the current application.

BACKGROUND OF THE INVENTION

The present invention relates generally to accessories for transporting objects, and more particularly, to devices, systems and methods for transporting objects over loose terrain.

The humble wheel is often cited as one of mankind's greatest inventions. It is used in almost all modern vehicles including cycles, motorized cycles, cars, trucks, trams, trains, planes and busses, as well as a huge and varied array of other transportation systems including wagons, carts, wheelbarrows, hand trucks, dollies, wheelchairs, coolers, stretchers, lawnmowers, chairs, roller skates, skateboards, suitcases, garbage cans and tractors.

Wagons are a well-known and commonly used means for transporting objects. They are typically easy and safe to use, labor-saving, and economical. Unfortunately, however, they aren't great on all terrain. More specifically, standard wagon wheels are typically designed for use with rigid or substantially rigid surfaces such as pavement, packed earth and grass, but tend to "dig in" on looser terrain such as sand and gravel. The labor-saving benefits of using a wagon are severely diminished when the terrain renders wagon wheels non-functional and the user must drag or carry the wagon to get where they want to go. This is particularly problematic with beachgoers who fill their wagons with children, food, toys and umbrellas only to discover their wagon doesn't roll across sand.

Others have attempted to make wagons more usable on looser terrain such as sand by permanently replacing some or all of the wheels with ski-type devices, thereby creating the problem of making transportation over rigid terrain very difficult. Others have tried to make wagons more usable on looser terrain by introducing a semi-permanent rigid material placed under the wheels to act as a sled, but these require laborious attachment and detachment depending on the terrain, plus the added inconvenience of transporting the rigid sled itself.

As can be seen, there is a need for devices, systems and methods for converting a wheeled carrier such as a wagon or cooler into a sliding carrier that can easily traverse loose terrain such as sand. It is desirable that these devices, systems and methods are quick and easy to set up; can be used with a wide variety of wheeled carriers and payloads; don't require modification of the underlying wheeled carrier for use; and are easily transported and stored when not in use. There is also a need for devices, systems and methods for transporting objects over loose terrain, particularly objects that are heavy and/or bulky, whether or not they have wheels.

SUMMARY OF THE INVENTION

Devices, systems and methods for transporting objects over loose terrain include at least one sliding member that is positioned under at least one wheel of a wheeled carrier such as a wagon. The sliding member includes an abutment against which the wheel rests such that when the wheeled carrier is in motion, namely pushed or pulled, the abutment is likewise pushed or pulled, thereby retaining the sliding member under the wheel. In this manner a wheeled carrier can be dragged on loose terrain such as sand similar to a sled or a ski, versus having the wheels dig into the sand. The converting devices and systems are preferably coupled to the wheeled carrier by gravity and the pushing or pulling force exerted on the carrier by the user, versus a permanent or semi-permanent mechanical connection. Thus, converting devices and systems can be quickly and easily removed from the wheeled carrier without tools or laborious manipulations. The devices, systems and methods can also be used for transporting non-wheeled objects.

Sliding members of the present invention can be constructed in a variety of configurations depending on the application and may include at least one stabilizing member. When multiple sliding members are employed, for example one sliding member per wheel on a shared axis of rotation, the system may include a spanning bar connecting the first and second sliding members one-to-the-other. Preferred embodiments may further include structures such as wheel housings, wheel stabilizing pads and protruding abutments.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

The following structure numbers shall apply to the following structures among the various FIGS.:
- 10—Conversion device;
- 20—Stabilizing member;
- 22—Spanning bar;
- 30—Sliding member;
- 31—Secondary sliding member;
- 32—Upper surface;
- 33—Wheel platform;
- 34—Abutment;
- 35—Lower surface;
- 36—Runner;
- 37—Bow;
- 38—Dragging edge;
- 39—Handle;
- 40—Attachment means;
- 41—Corresponding attachment means;
- 42—First attachment site;
- 44—Second attachment site;
- 47—Leading edge;
- 50—Wheeled carrier;
- 52—First wheel;
- 53—Second wheel;
- 55—Carrier steering bar;
- 60—Terrain;
- 70—Wheel housing;
- 72—Wheel stabilizing pad;
- 73—Wheel containment ridge;
- 74—Protruding abutment;
- 77—Wheel housing attachment means;
  - 77a—Upper surface attachment means component;
  - 77b—Housing attachment means component;
- 85—Bifold slider;
- 86—Trifold slider;
- 88—Fold; and
- 89—Hinge.

Figure 1:
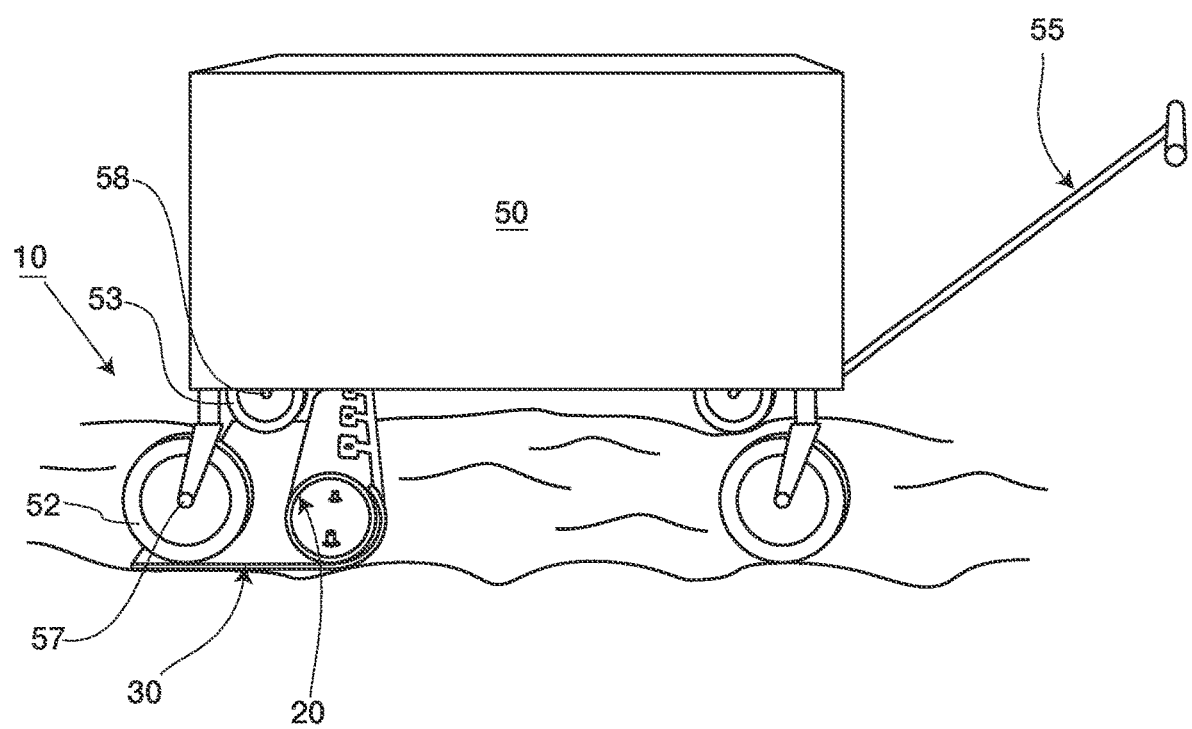
FIG. 1 is a wheeled carrier outfitted with an embodiment of the present invention.

Referring to FIG. 1, an embodiment of conversion device 10 includes sliding member 30 positioned under first wheel 52 and second wheel 53 of wheeled carrier 50, with each wheel rotating around corresponding axles 57, 58 although some wheeled carriers will include multiple wheels on a single axle. Sliding member is attached to and steadied by stabilizing member 20. A sliding member is preferably employed for all of the wheels sharing an axle, whether that be one wheel, two wheels, or more, although wheels on more than one axle can share a sliding member. In FIG. 1 a single sliding member is positioned under two wheels. As used herein, "wheeled carrier" refers to an array of devices and systems, typically pulled or pushed, that transport living things and/or articles including wagons, carts, rolling bags, wheelbarrows, hand trucks, dollies, wheelchairs, gurneys, rolling suitcases, rolling garbage cans and wheeled coolers. It should be understood that many embodiments of the present invention can likewise be employed with objects other than wheeled carriers, and in particular large and/or bulky objects, for example coolers and boxes. For simplicity, a wagon will be used herein to represent wheeled carriers and objects in general. "Conversion device" and the like shall refer to devices for transporting wheeled carriers and non-wheeled objects.

Figure 2:
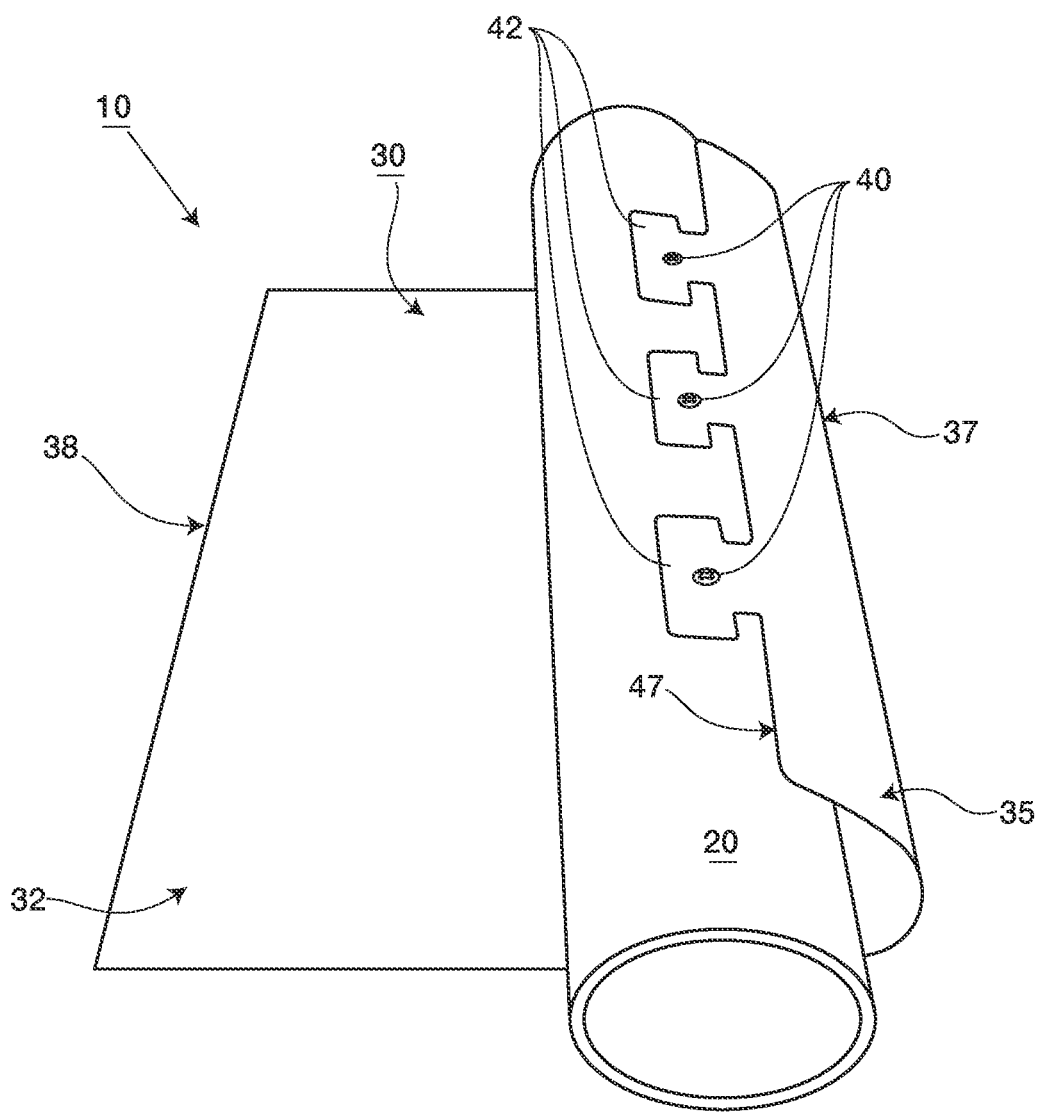
FIG. 2 is an embodiment of the present invention having a unitary runner and stabilizing member.

FIG. 2 depicts the conversion device of FIG. 1 in more detail. In this embodiment sliding member 30 is substantially permanently attached to stabilizing member 20 at first attachment sites 42 with a plurality of attachment means 40. In this configuration the sliding member is oriented such that it partially wraps around the perimeter of the stabilizing member, thereby creating a bow 37 along leading edge 47, and dragging edge 38 at the opposing end of the sliding member. Sliding member 30 includes upper surface 32 and lower surface 35, the latter of which is preferably substantially smooth so as to facilitate gliding or sliding on loose terrain. The sliding member is preferably constructed of a durable semi-rigid material such as a plastic having a thickness between approximately $\frac{1}{30}^{th}$ and approximately $\frac{1}{4}^{th}$ of an inch, and more preferably between approximately $\frac{1}{16}^{th}$ and approximately $\frac{1}{8}^{th}$ of an inch such that the sliding member is resilient enough to withstand the downward force of the wheeled carrier without substantial deformation. Stabilizing member 20 depicted in FIG. 2 is a hollow cylindrical structure, but a variety of sizes, shapes, and constructions are within the scope of the invention.

Figure 3:
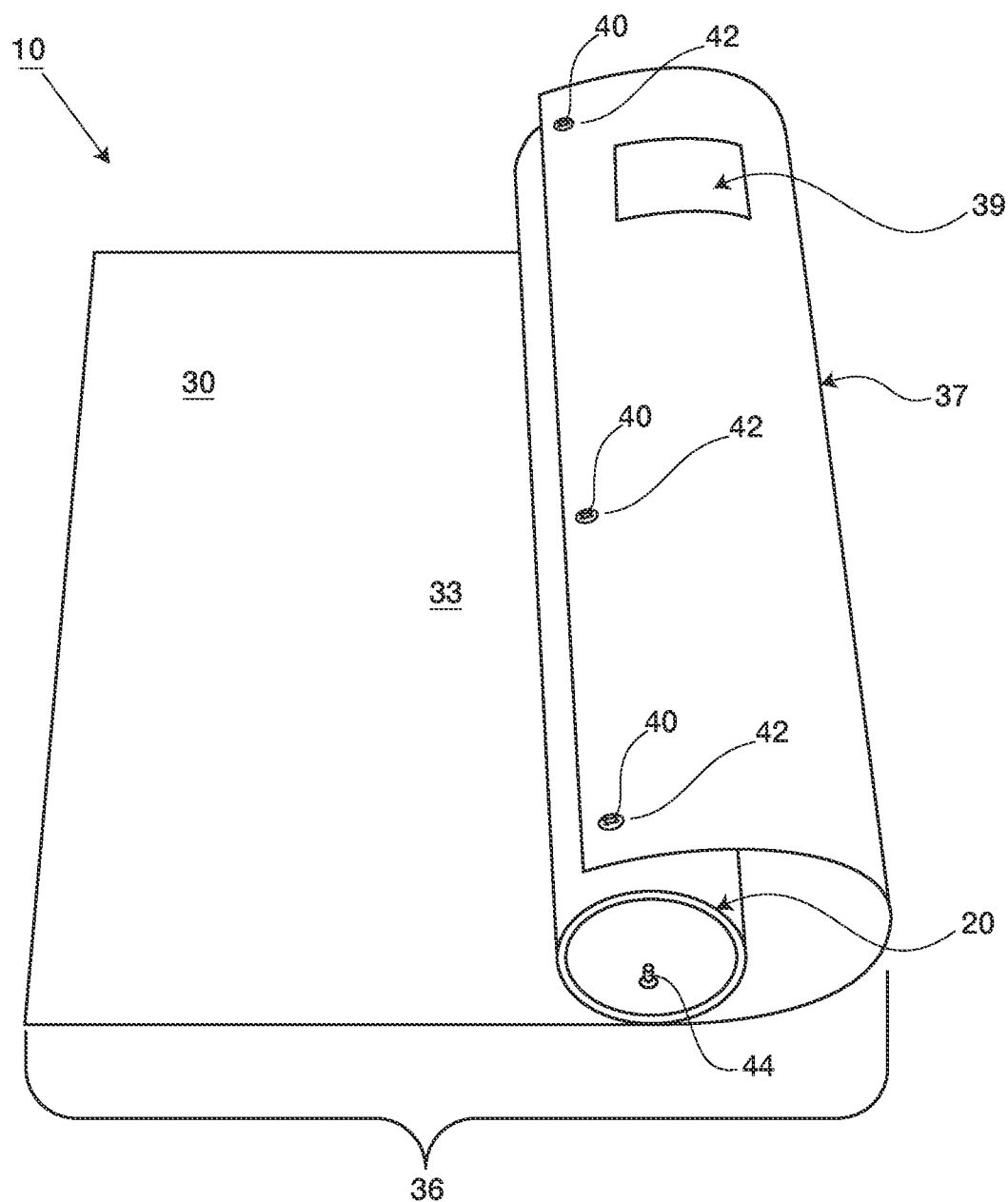
FIG. 3 is an embodiment of the present invention having a flexible unitary runner.

FIG. 3 depicts conversion device 10 including an aperture defined by sliding member 30 which creates handle 39. The downwardly oriented surface of sliding member 30 is generally referred to as runner 36, and is loosely structurally and functionally analogous to the runner of a sled or toboggan. The upwardly oriented surface of the sliding member in the region near stabilizing member 20 is generally referred to as wheel platform 33, so named because the wheels of the wheeled carrier will generally rest in this area. It is noted that in this embodiment attachment means 40 are connected directly to the stabilizing member, and lack the tabular first attachment sites found in the embodiment of FIG. 2. FIG. 3 also depicts second attachment site 44, where the sliding member again attaches to stabilizing member 20. Having two attachment sites is beneficial for structural integrity as well as establishing a desirable form for the resulting bow 37.

Figure 4:
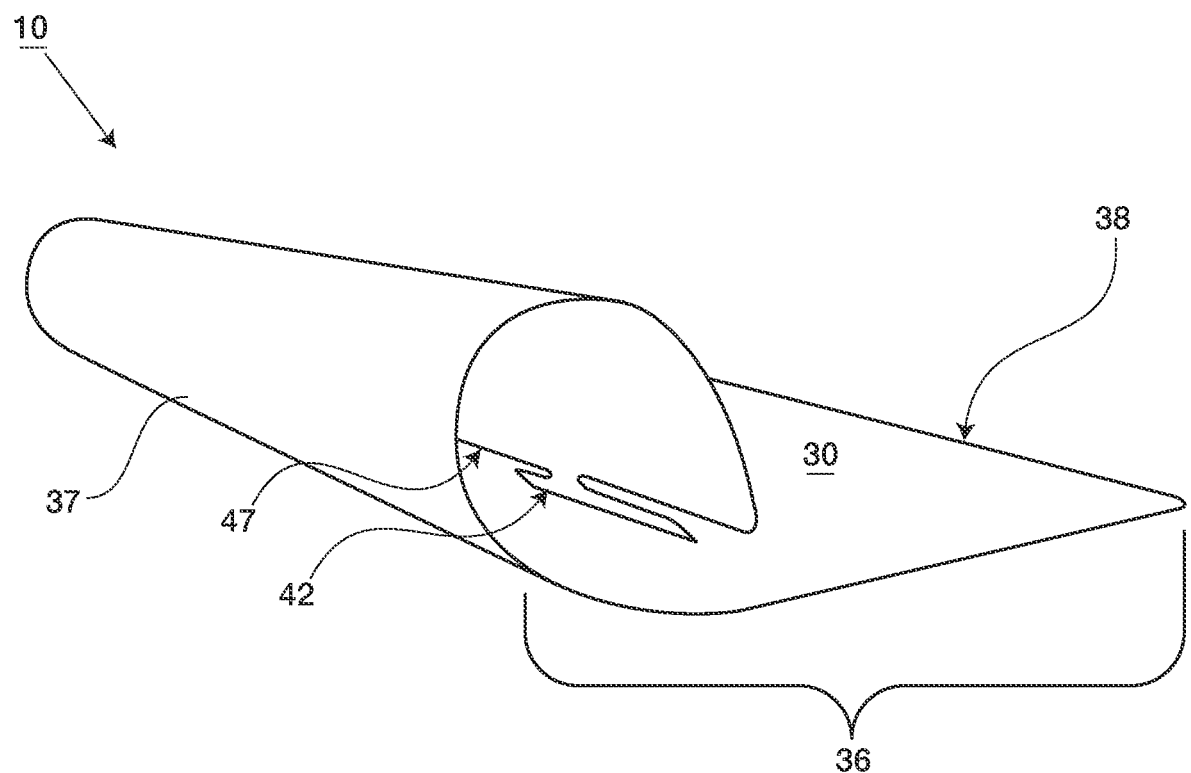
FIG. 4 is an embodiment of the present invention having a unitary runner but no stabilizing member.

FIG. 4 depicts another embodiment of conversion device including sliding member 30 but no stabilizing member 20. Although the attachment means is not shown, the sliding member attaches to itself along leading edge 47 at first attachment site 42, thereby creating bow 37, runner 36 and dragging edge 38. This embodiment has particular utility in sliding objects without wheels, for example boxes, refrigerators, furniture, propane tanks and kegs. More specifically, one would place an item to be moved on the upward facing surface of the sliding member and either push or pull the item such that the item is not displaced relative to the sliding member, but rather pushes or pulls the sliding member underneath the item. The sliding member should be oriented such that the pushing or pulling force drives the bow forward and dragging edge 38 trails behind.

This embodiment is one example of the bow having a substantially teardrop shaped bow. As used herein "substantially teardrop shaped" and the like refers to the bow having an outwardly directed curved portion that tapers inwardly towards dragging edge 38 of sliding member 30. It is noted that the sliding member does not need to directly connect with itself to be "substantially teardrop shaped", and can, for example, include an attachment means. It has been found that the teardrop shape generally performs better in soft sand versus the more cylindrical bows because the teardrop shape disperses sand in its path very efficiently thereby preventing the formation of mounds and piles of sand which impede sliding.

Figure 5:
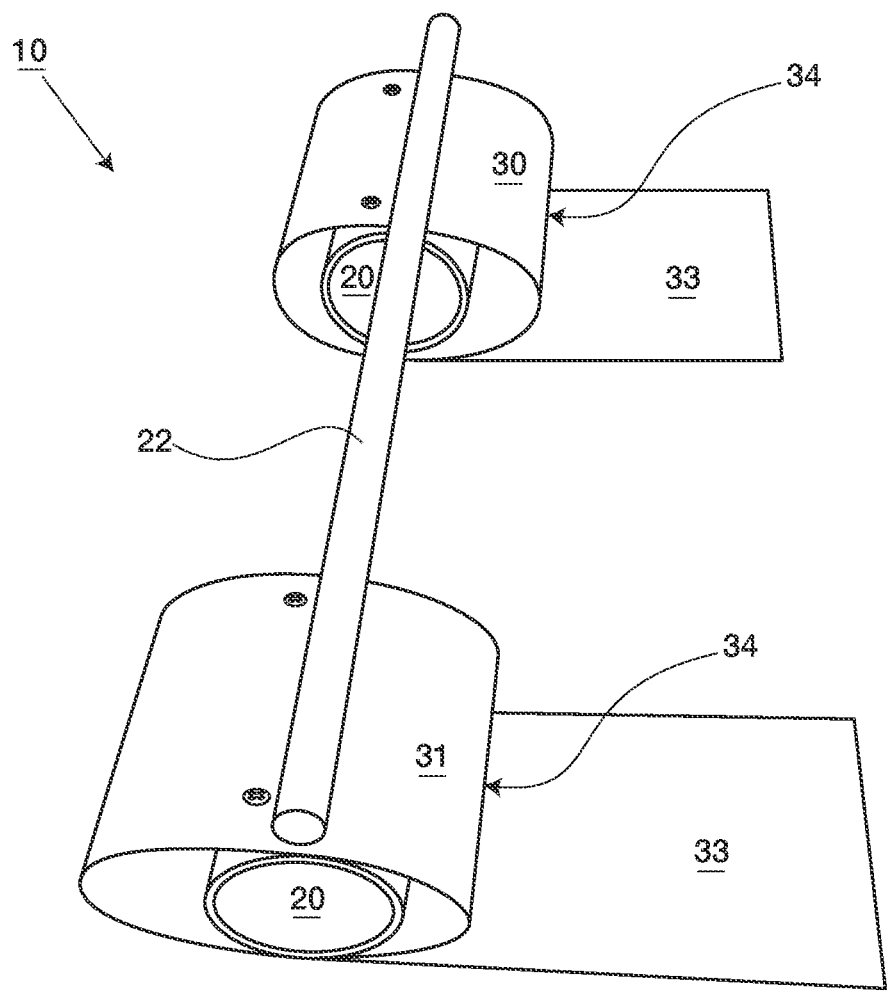
FIG. 5 is an embodiment of the present invention including dual runners and a spanning bar therebetween.

FIG. 5 is yet another embodiment of conversion device 10 including sliding member 30 and secondary sliding member 31 attached one to the other by spanning bar 22. Each sliding member is connected to their respective stabilizing members 20. This embodiment creates two separate wheel platforms 33, each of which accommodate at least one wheel. Spanning bar 22 is depicted as a unitary structure, but telescoping, hinged and other rigid yet adjustable spanning bars, and particularly those that can be made more compact for portability, are within the scope of the invention.

Figure 6:
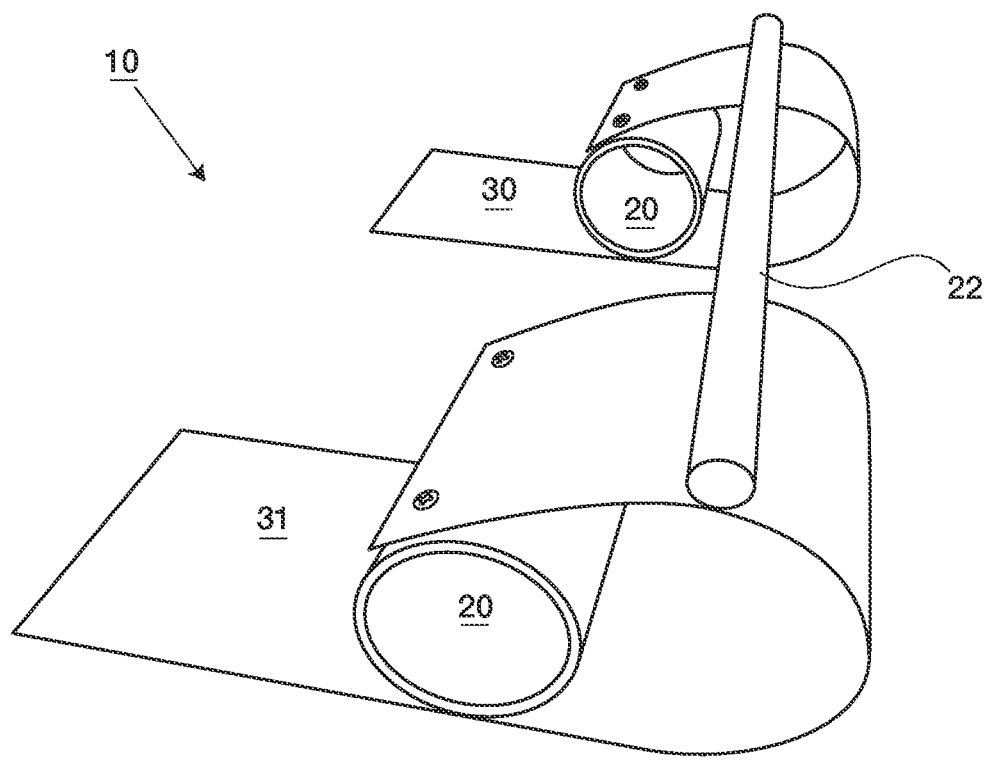
FIG. 6 is an embodiment of the present invention including dual runners and a spanning bar therebetween.
Figure 7:
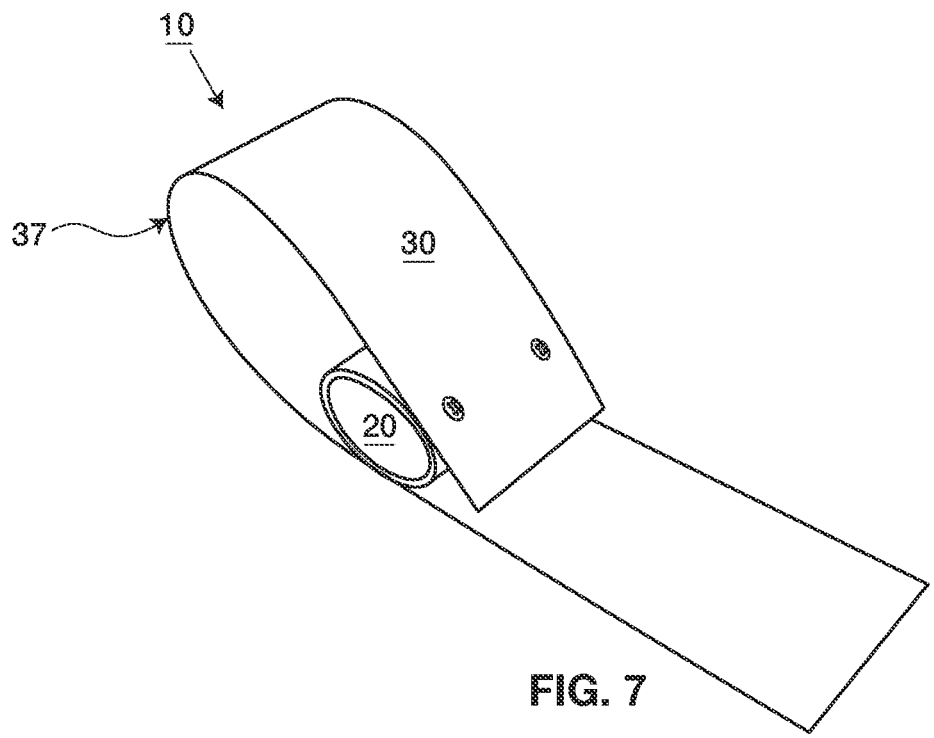
FIG. 7 depicts the sliding member attached to the stabilizing member in one configuration.
Figure 8:
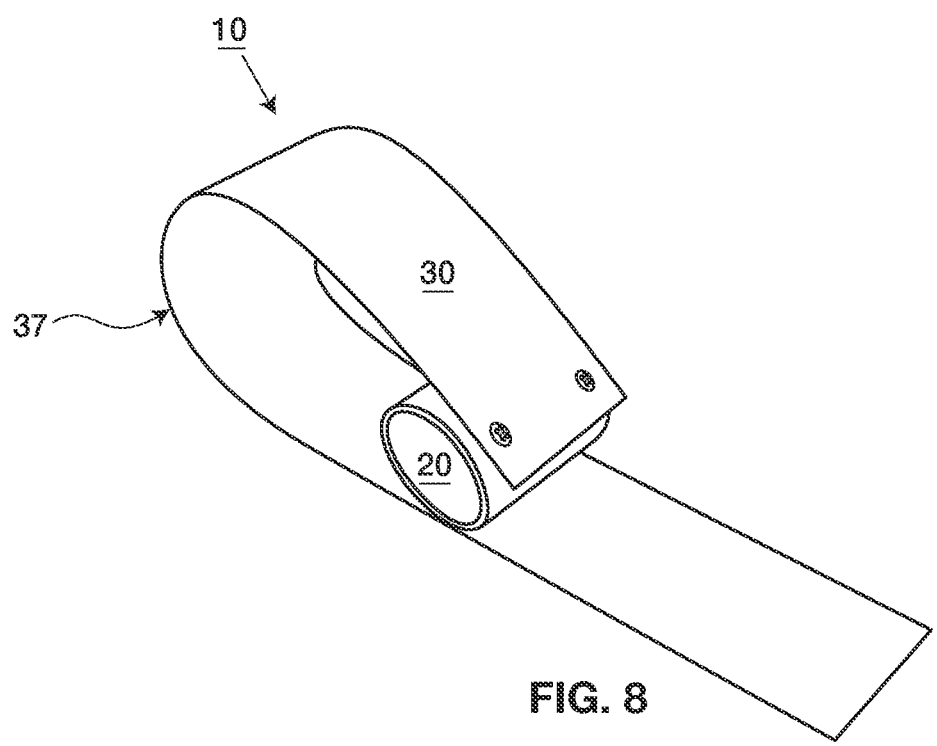
FIG. 8 depicts the sliding member attached to the stabilizing member in another configuration.

FIG. 6 depicts another dual runner embodiment of conversion device 10. In this version sliding member 30 and secondary sliding member 31 do not fully wrap around corresponding stabilizing members 20. Also, spanning bar 22 is connected directly to the sliding members, and not directly to the stabilizing members. FIGS. 7 and 8 depict attachment of sliding members 30 to stabilizing members 20 in different locations, thereby altering the size and shape of substantially teardrop shaped bows 37.

Figure 9:
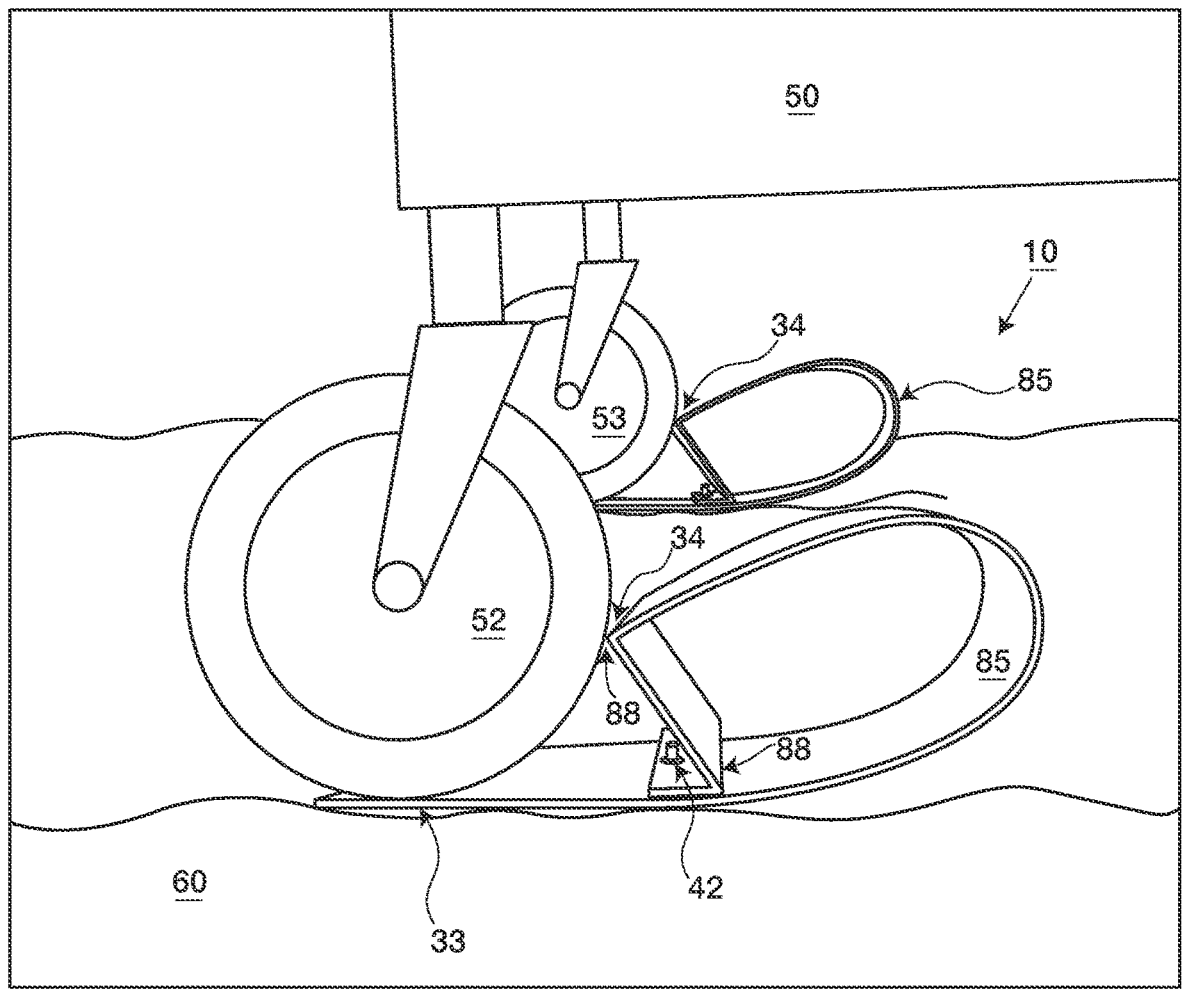
FIG. 9 depicts an embodiment of the present invention with carrier wheels in position.
Figure 10:
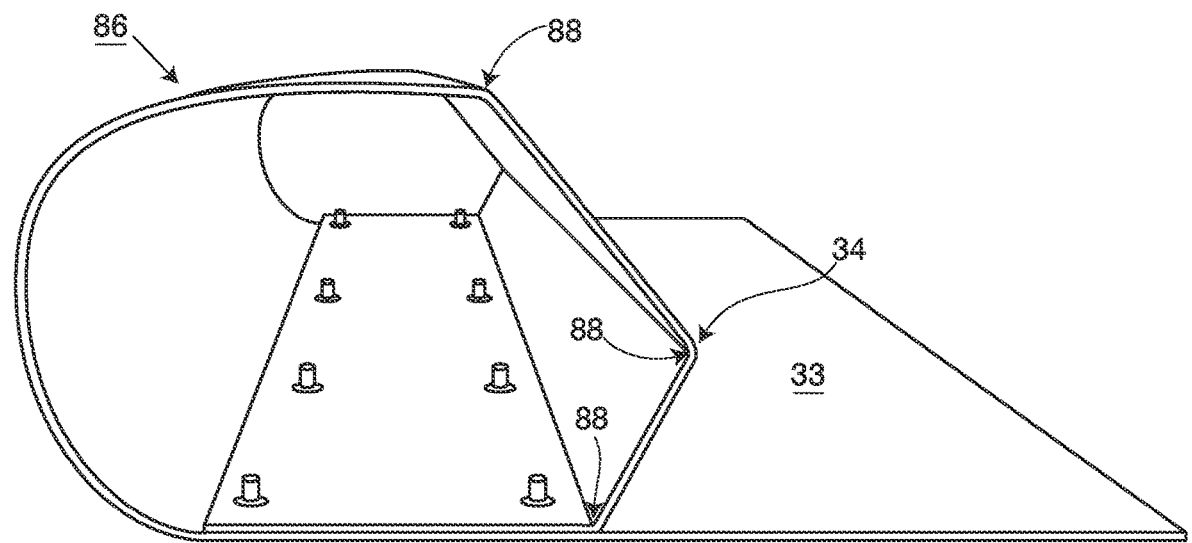
FIG. 10 depicts a trifold slider of the present invention.
Figure 11:
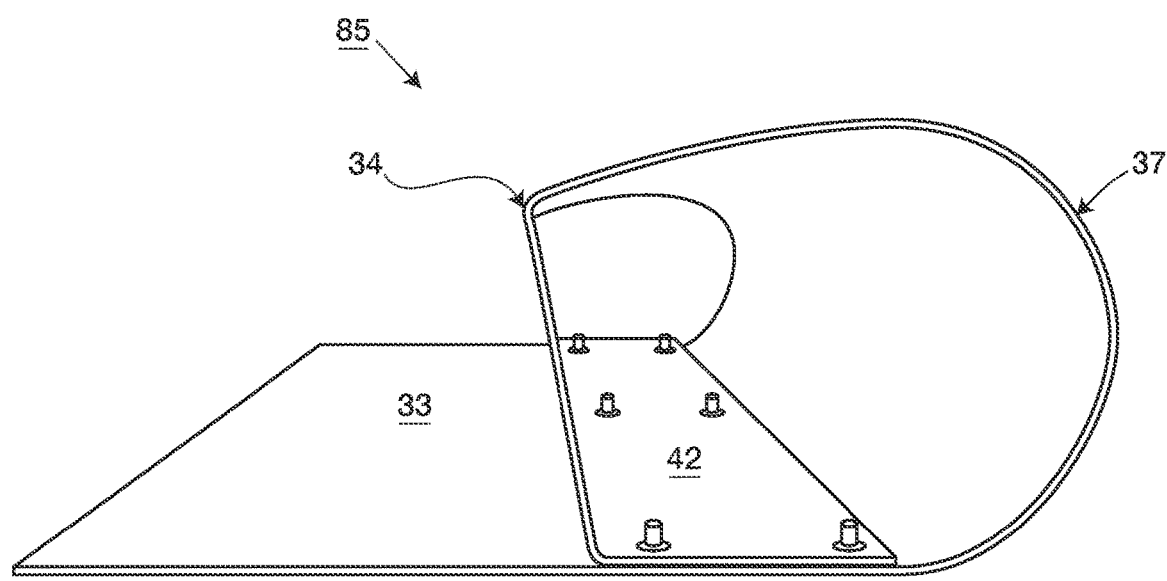
FIG. 11 depicts a bifold slider of the present invention.

FIG. 9 depicts an embodiment of conversion device 10 including two bifold sliders 85, so named because the sliding members each contain two distinct folds 88 in their structures. In this embodiment one of the folds forms abutment 34 against which first and second wheels 52, 53 exert force. FIG. 10 depicts an embodiment having trifold slider 86 defining three distinct folds 88, again with one of the folds defining abutment 34. FIG. 11 depicts an embodiment having bifold slider 85 forming abutment 34, with this construction varying from the bifold slider of FIG. 9 insofar as attachment site 42 is within bow 37.

Figure 12:
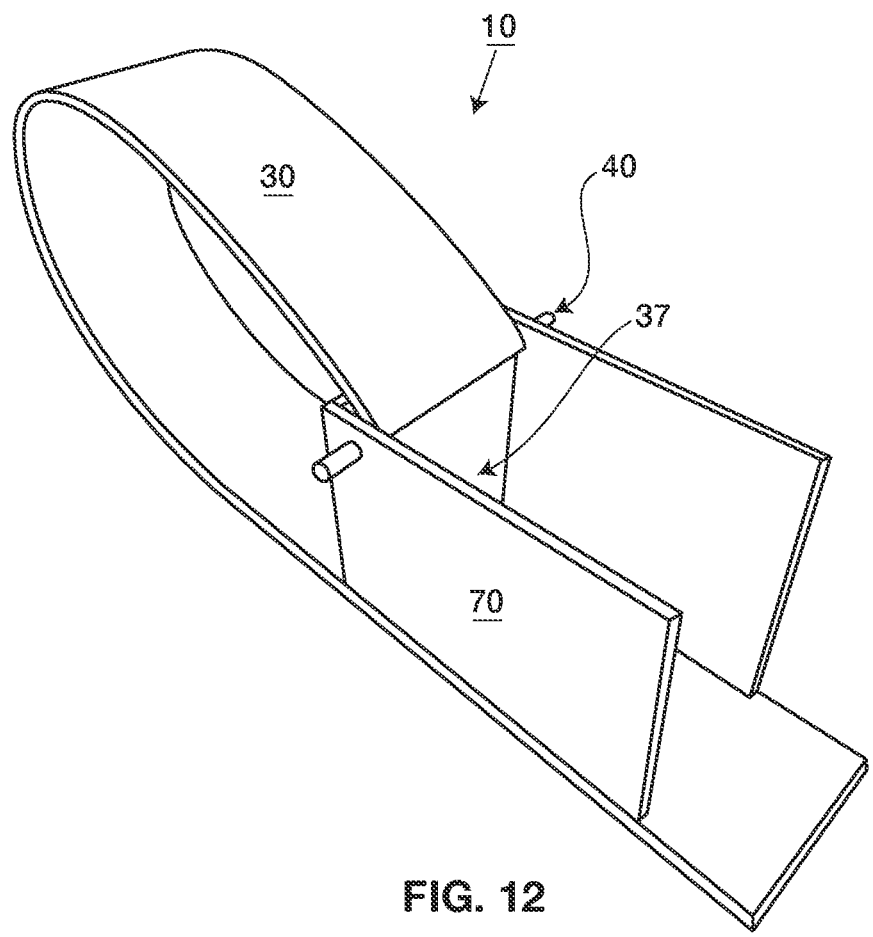
FIG. 12 depicts a sliding member of the present invention including a wheel housing.
Figure 13:
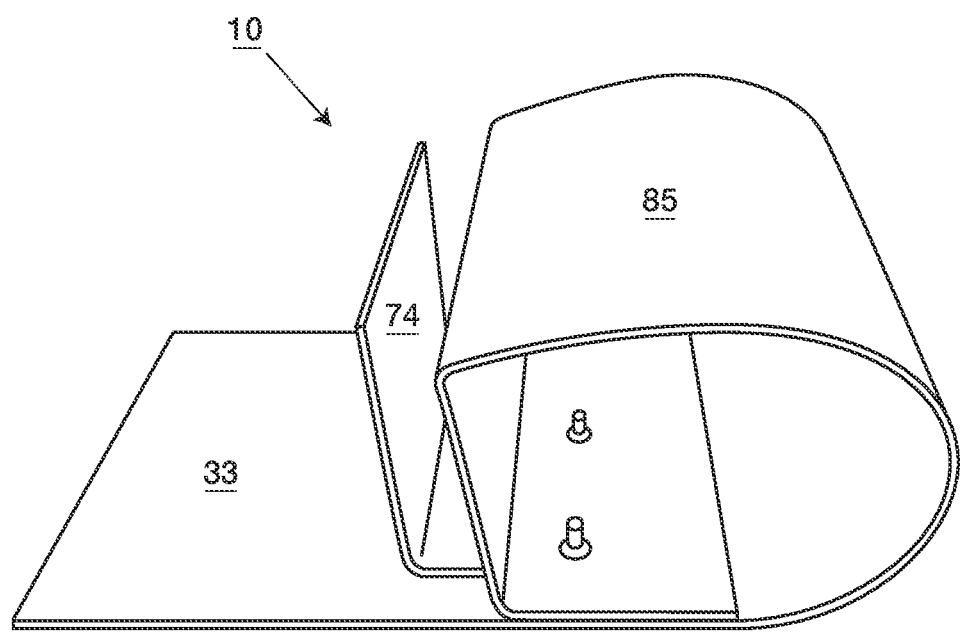
FIG. 13 depicts an embodiment of the present invention including a protruding abutment.
Figure 14:
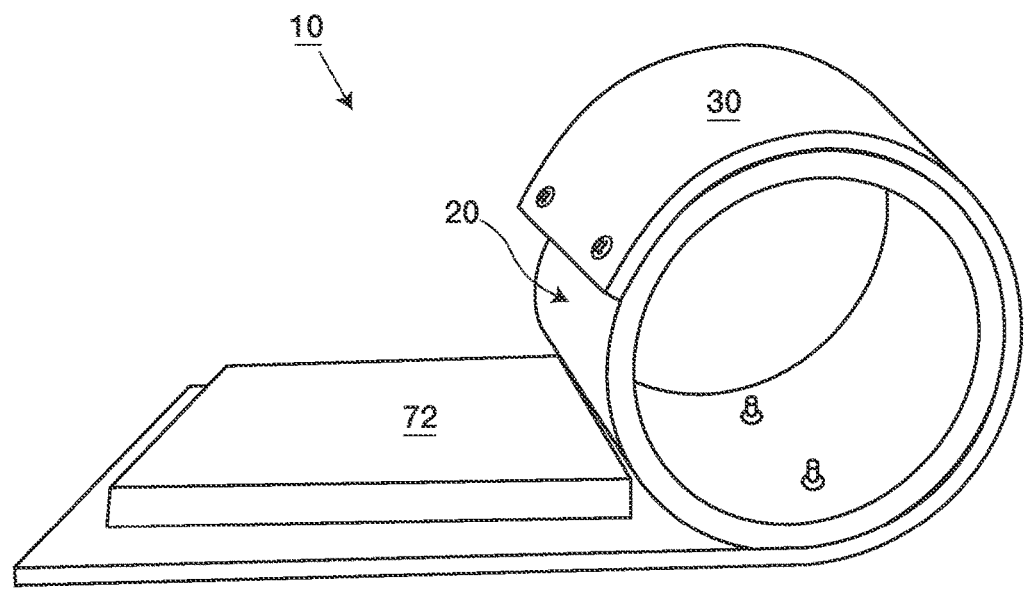
FIG. 14 depicts an embodiment of the present invention including wheel stabilizing pads.
Figure 15:
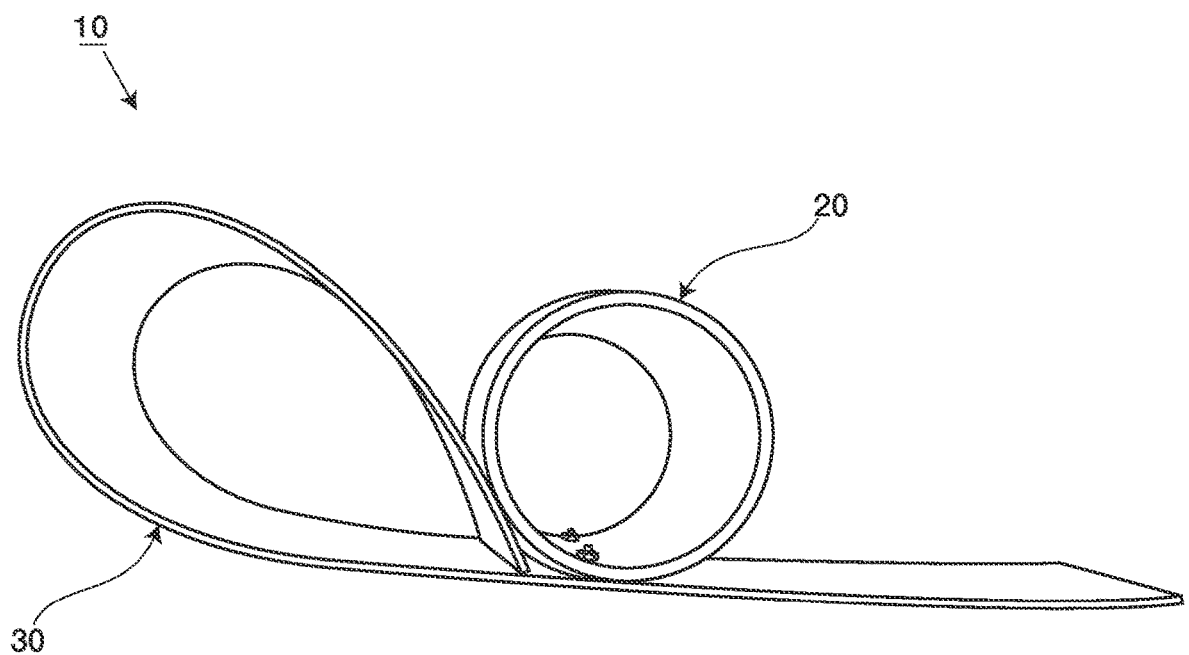
FIG. 15 depicts an embodiment with the stabilizing member outside the sliding member.
Figure 16:
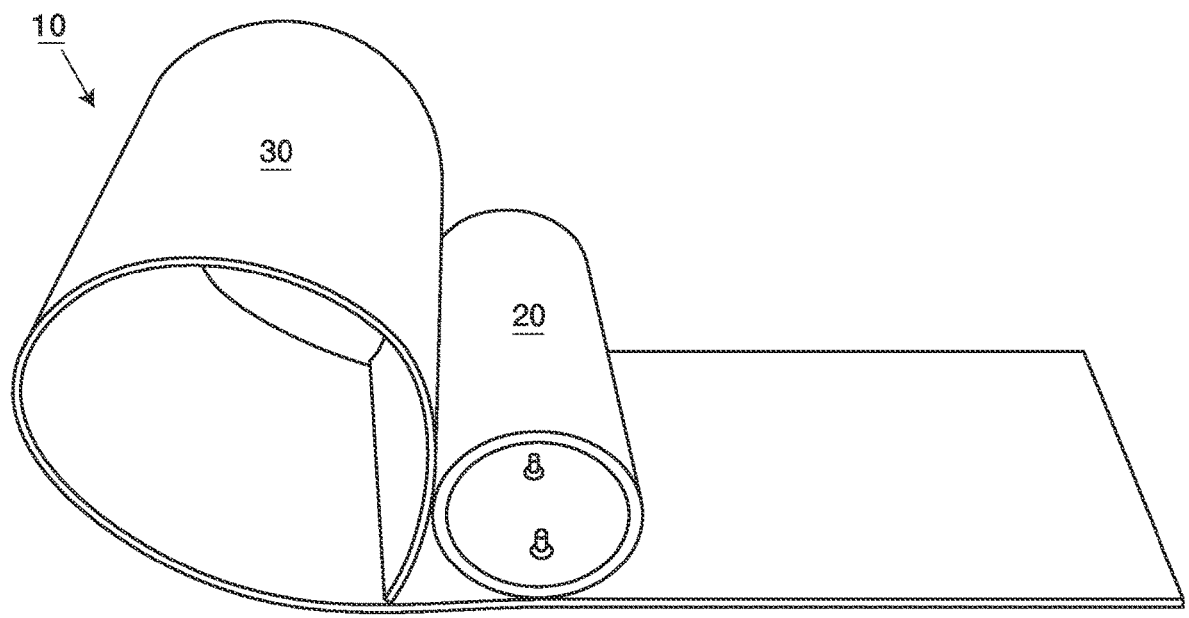
FIG. 16 depicts another embodiment with the stabilizing member outside the sliding member.
Figure 17:
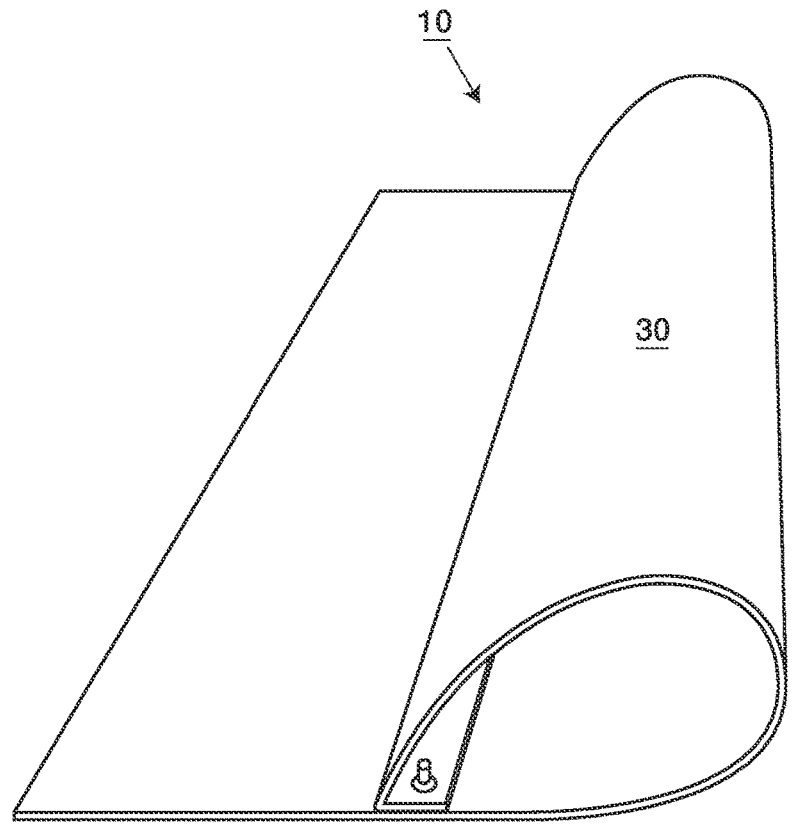
FIG. 17 depicts an embodiment without a stabilizing member.

FIG. 12 depicts yet another embodiment incorporating wheel housing 70 and pin connector attachment means 40. In use the back wall of housing 70 serves as abutment 37. FIG. 13 depicts an embodiment of conversion device 10 including protruding abutment 74 and bifold slider 85. FIG. 14 depicts optional wheel stabilizing pad 72 to help retain a wheel in position by preventing unwanted sliding and rotation. FIGS. 15 and 16 depict embodiments of conversion device 10 including stabilizing members 20 located fully outside the enclosures formed by sliding member 30. While the embodiment of claim 15 would accommodate a single wheel, the embodiment of FIG. 16 may be wide enough to accommodate two wheels, for example a wagon. FIG. 17 depicts an embodiment of conversion device 10 that does not include a stabilizing member. Similar to the embodiment of FIG. 4, this version could be utilized for moving objects without wheels.

Figure 18:
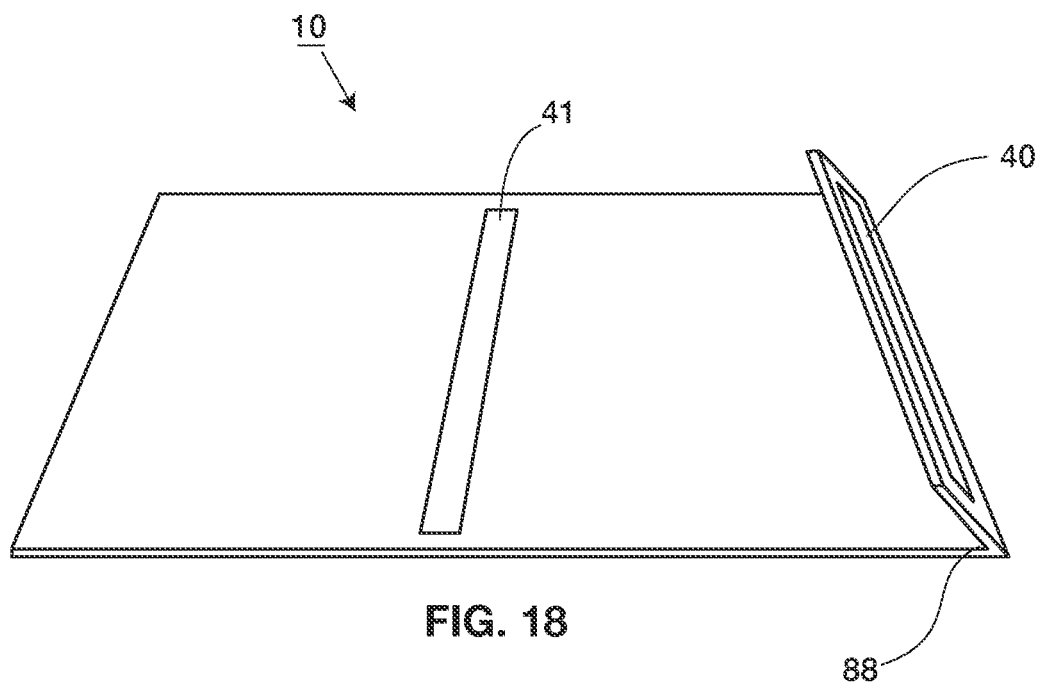
FIG. 18 depicts an embodiment unfurled that utilizes hook and loop fasteners.
Figure 19:
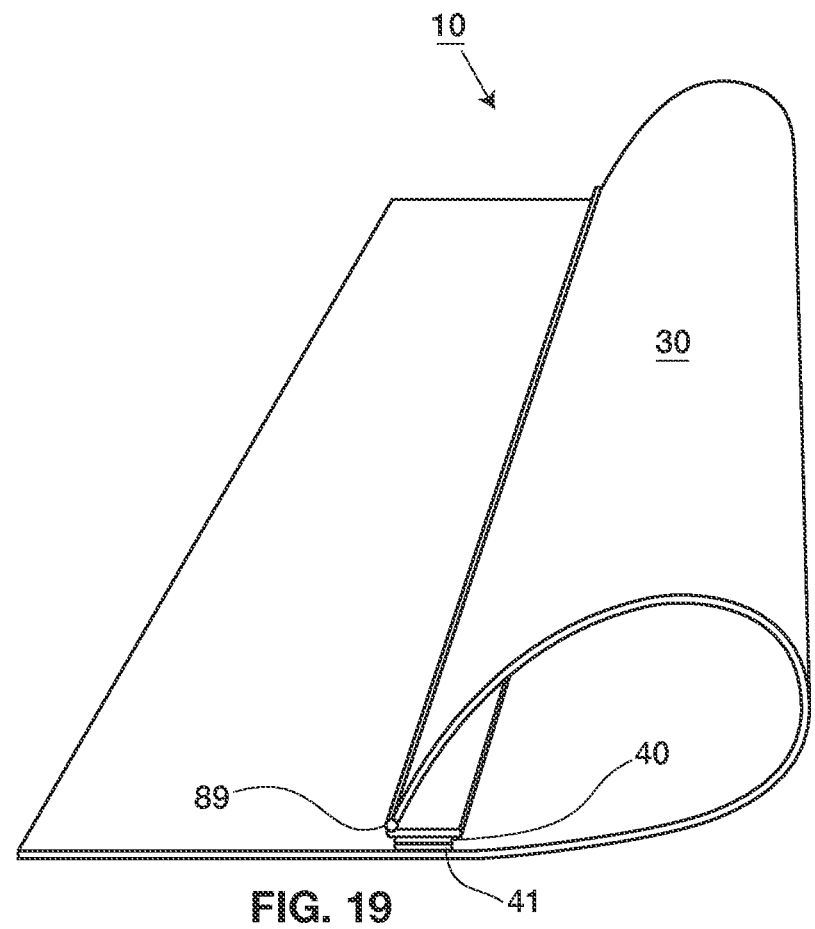
FIG. 19 depicts an embodiment utilizing hook and loop fasteners and including a hinge.

FIG. 18 depicts an unfurled embodiment depicting hook and loop fastener attachment means 40 and corresponding attachment means 41. These attachment means are deemed "temporary" insofar as they can be engaged and disengaged repeatedly, versus "permanent" attachment means such as rivets and adhesives. Hoop and loop fasteners are depicted but other temporary attachment means including snaps, buttons, insertion sleeves, clips, pegs with caps, and hook and eyelet fasteners are all within the scope of this invention. This embodiment also includes fold 88 to more closely orient attachment means 40, 41 for subsequent connection, versus if there was no fold and the attachment means were oriented in opposite directions. FIG. 19 depicts an embodiment similar to that set forth in FIG. 18 except it includes hinge 89 instead of fold 88.

Figure 20:
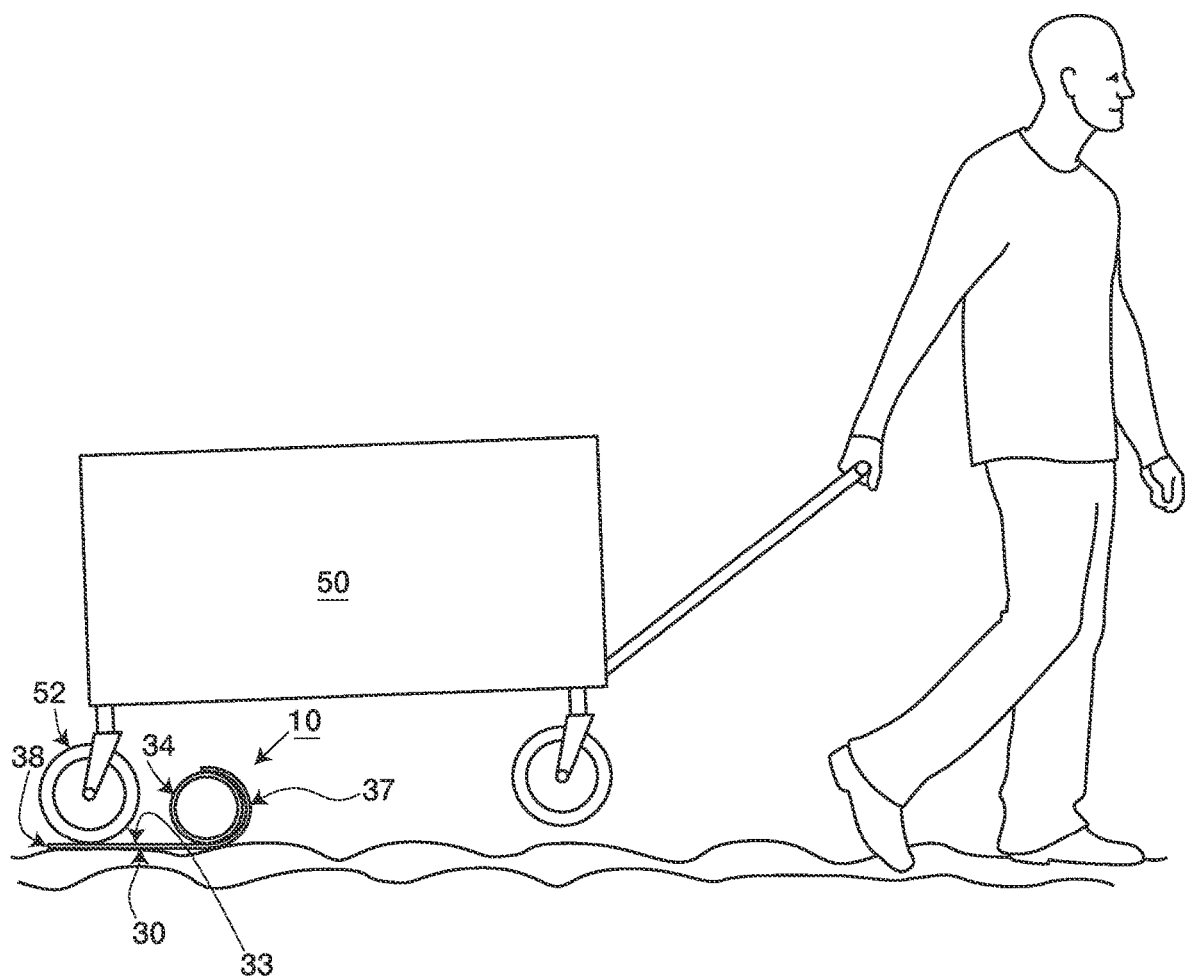
FIG. 20 depicts an embodiment of the invention in use.

Referring to FIG. 20, in use a user would position conversion device 10 under at least one wheel 52 of wheeled carrier 50 such that the wheel sits atop wheel platform 33 section of sliding member and is proximal to abutment 34. This could be accomplished by positioning the conversion device in front of the relevant wheels of the wheeled carrier and pulling the wheeled carrier into position, or by lifting the wheeled carrier and positioning the conversion device completely or partially under the wheels. In FIG. 20 wheeled carrier 50 is atop the wheeled carrier but not yet in contact with abutment 34, although it should be understood that the user would need to pull the wheeled carrier forward to bring wheels 52, 53 (53 not shown) adjacent to abutment 34 for the conversion device to be dragged by the wheeled carrier in motion. Conversion device 10 should be oriented such that bow 37 is forward relative to dragging edge 38 when the wheeled carrier is being pulled or when it is being pushed. By way of example if the user were pushing the wagon of FIG. 19 bow 37 would be to the left of the wheel and dragging edge 38 would be to the right of the wheel. The user then pushes or pulls the wheeled carrier in the normal manner thereby pushing or pulling the wheel into the abutment, and dragging the conversion device underneath the wheeled carrier while the wheeled carrier is in motion. Depending on the specific wheeled carrier, the user may employ conversion devices on all wheels, or in the example of FIG. 20 may employ the conversion device on only some wheels. Here the user is raising the front wheels and therefore a conversion device for the front wheels may not be needed. It is preferable that conversion device 10 is not mechanically connected to wheeled carrier 50, and therefore can be employed and removed quickly and easily.

Figure 21:
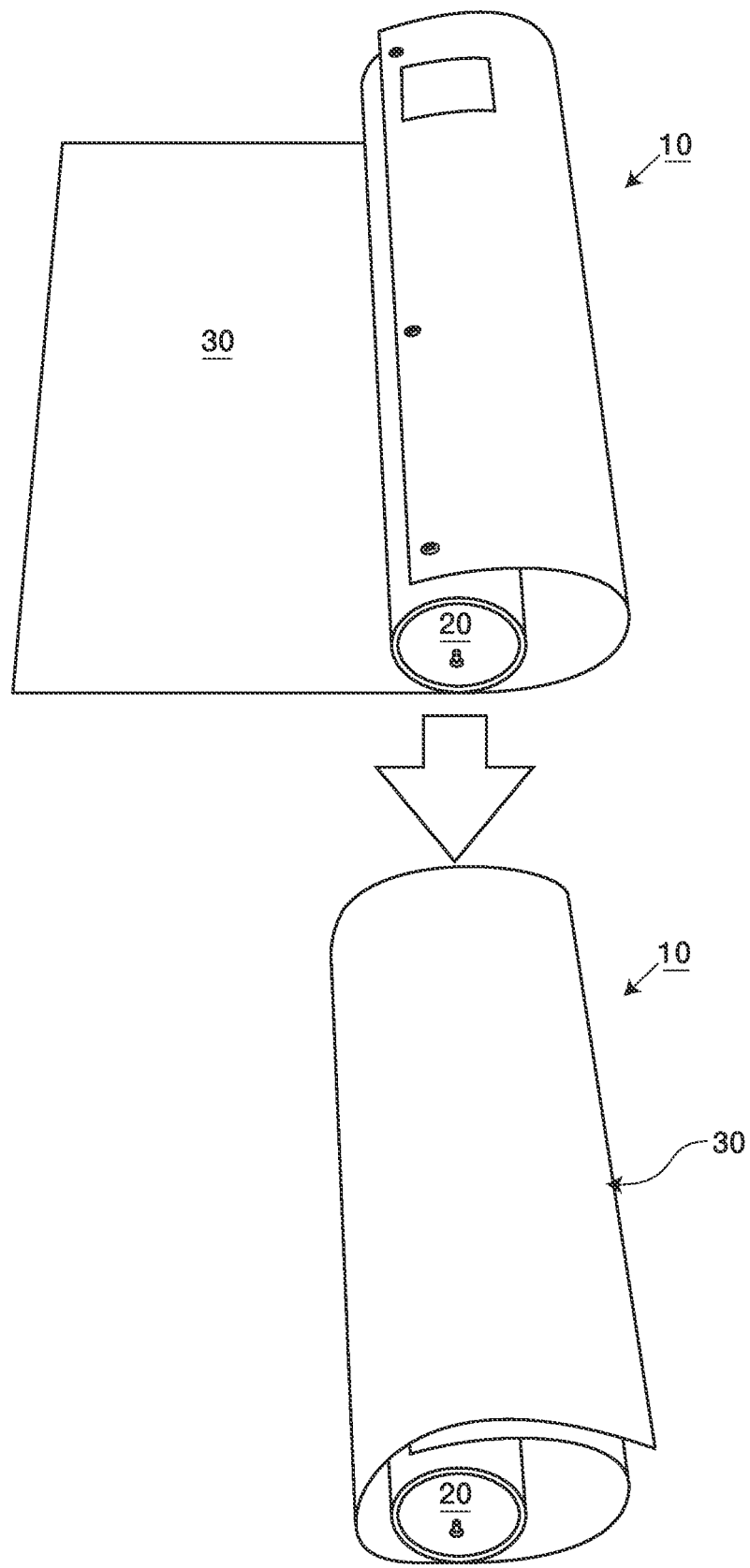
FIG. 21 depicts an embodiment of the present invention being rolled for transportation and/or storage.

Referring to FIG. 21, some embodiments of conversion device 10 can be stored and transported easily by rolling sliding member 30 around stabilizing member 20.

Figure 22:
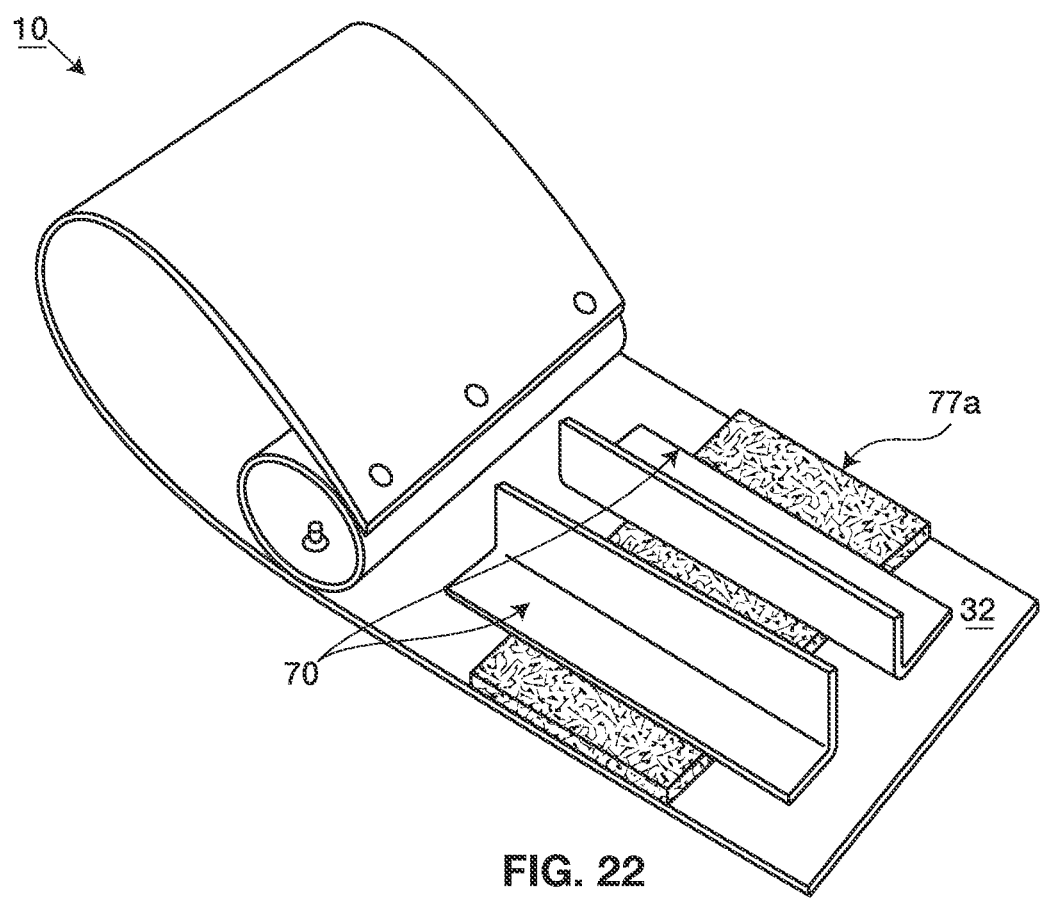
FIG. 22 depicts an embodiment including adjustable wheel housings.
Figure 23:
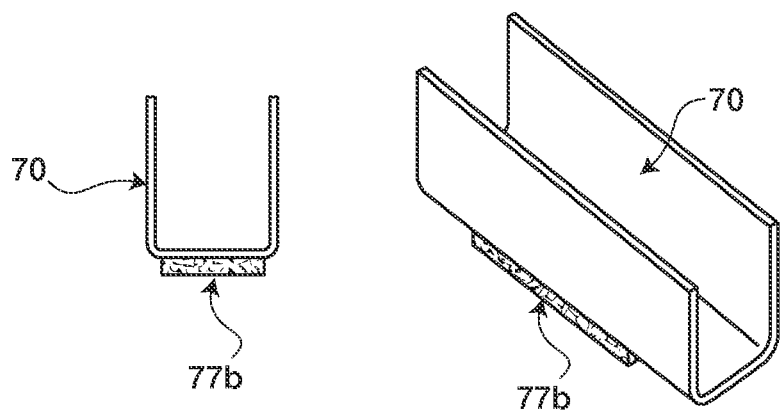
FIG. 23 depicts two views of an alternative wheel housing.
Figure 24:
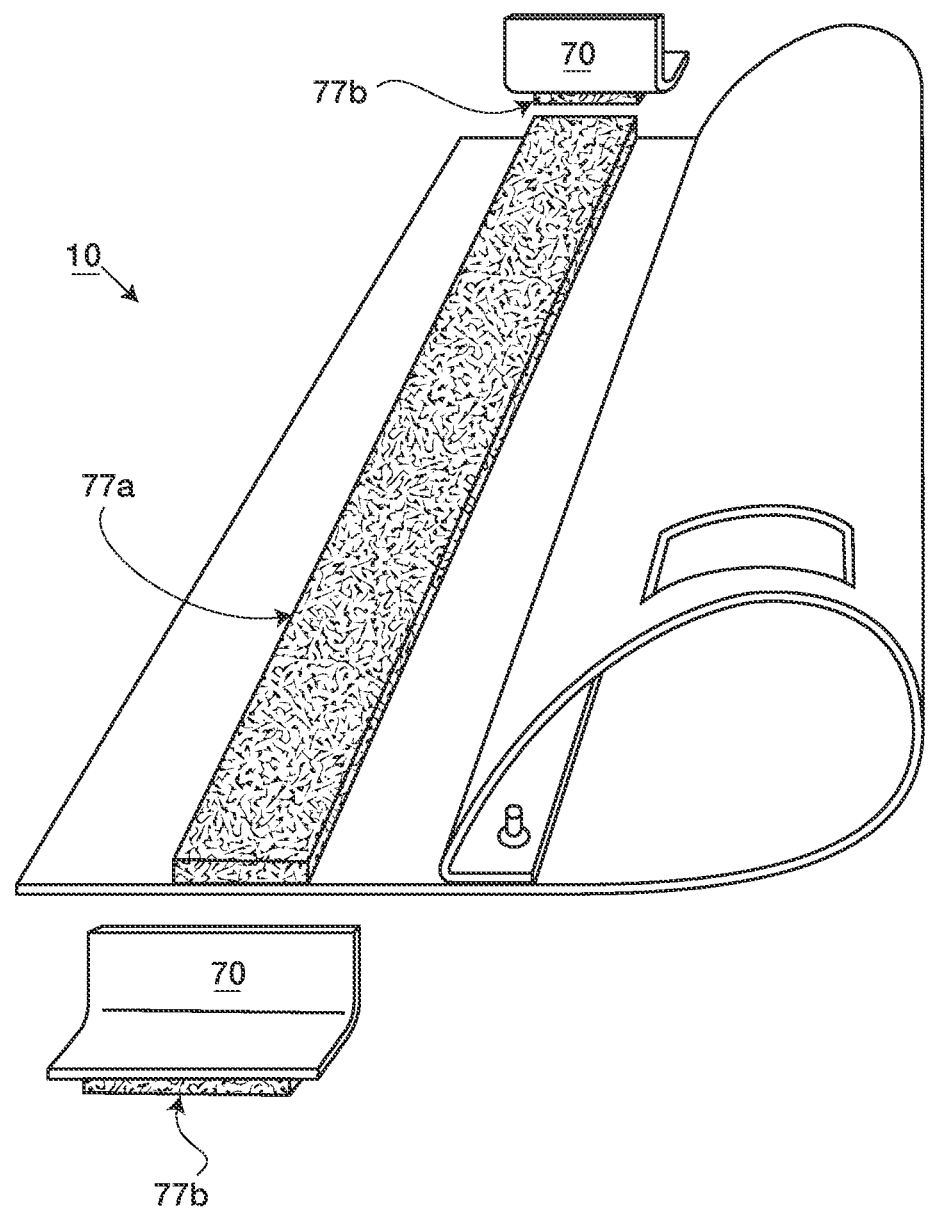
FIG. 24 depicts an embodiment including alternative adjustable wheel housings.

Referring to FIG. 22, an embodiment of conversion device 10 includes a wheel housing attachment means for temporarily connecting wheel housing 70 to upper surface 32. In a preferred embodiment wheel housing attachment means includes upper surface attachment means 77a releasably engaged with housing attachment means component 77b by hook and loop fastener, although other attachment means are within the scope of this invention. In this manner wheel housing 70 can be releasably attached in various positions, or not attached at all if preferred. FIG. 23 depicts an alternative embodiment of wheel housing 70 including two vertical walls, shown in two views. FIG. 24 depicts single vertical wall wheel housing 70 embodiment including housing attachment means component 77b poised for attachment to upper surface attachment means component 77a.

Figure 25:
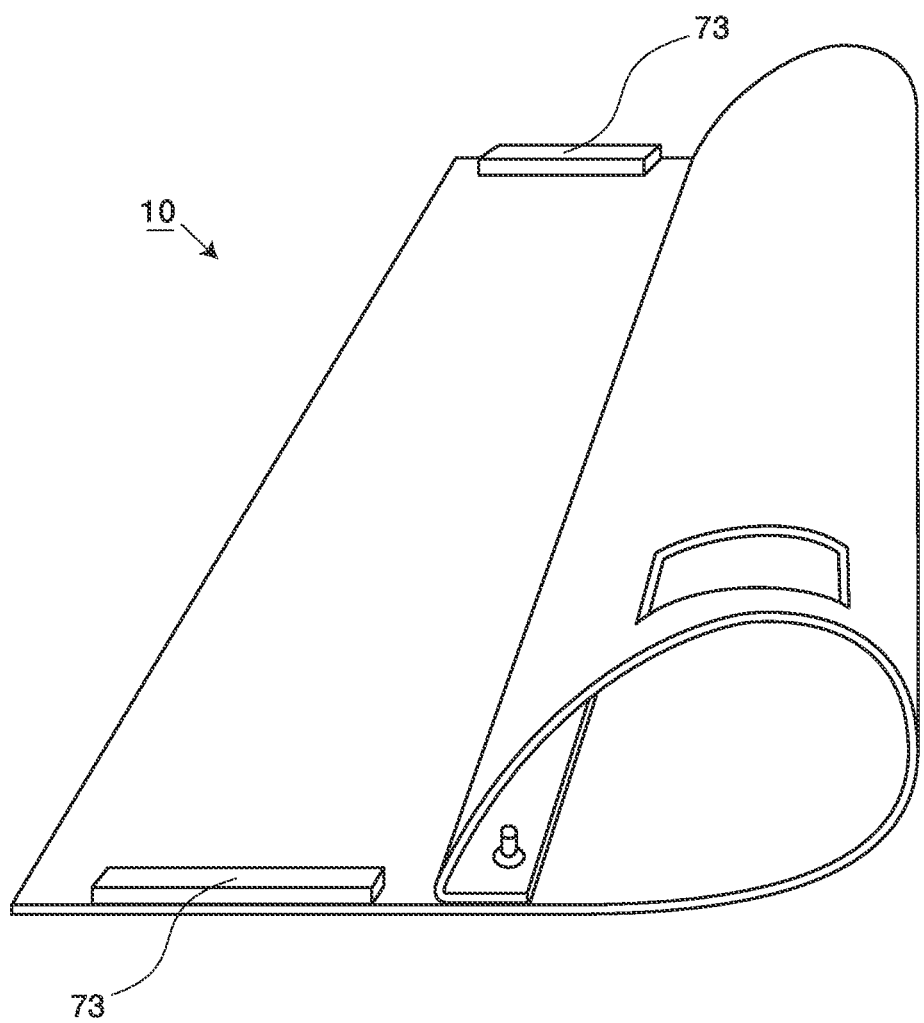
FIG. 25 depicts an embodiment including wheel containment ridges.
Figure 26:
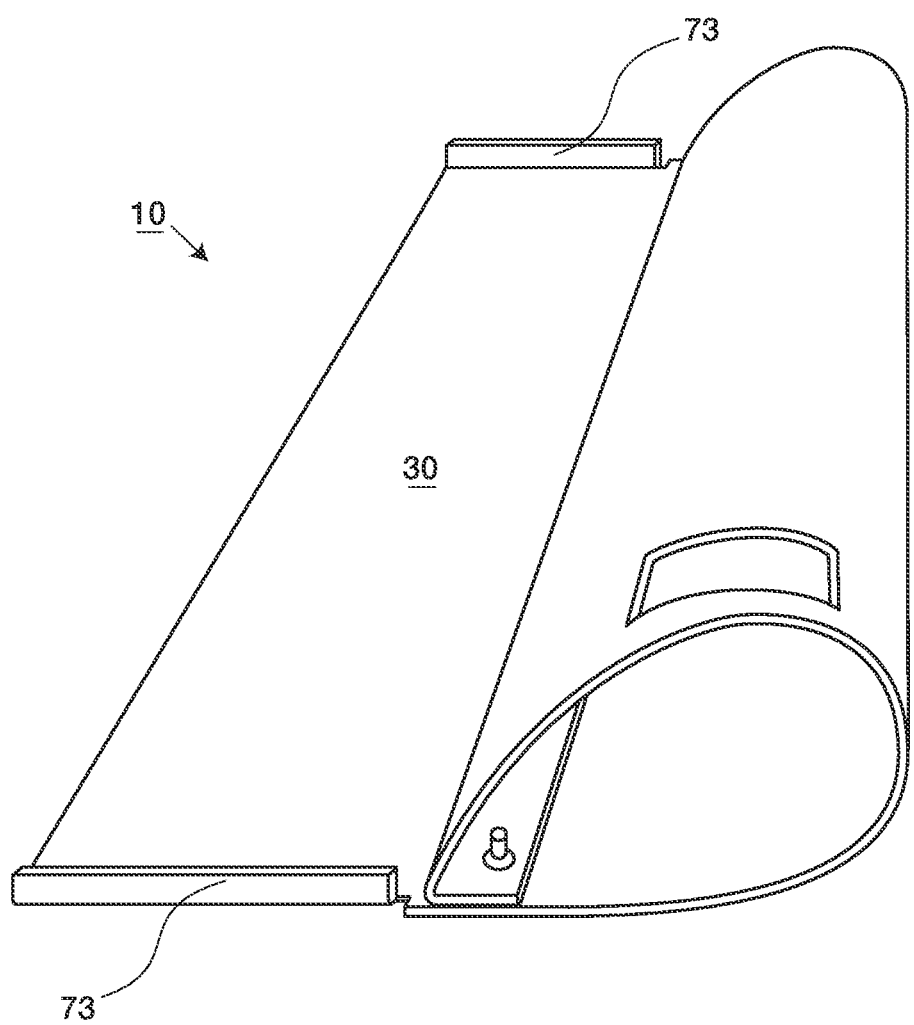
FIG. 26 depicts an embodiment including alternative wheel containment ridges.

Referring to FIGS. 25 and 26, in an alternative embodiment wheels can be retained laterally using wheel containment ridge 73, which can be constructed of a soft or semi-soft material such as foam (FIG. 25) or by upturned lateral edges (FIG. 26) in the case of a substantially rigid sliding member 30. Non-continuous containment ridges, for example spaced apart segments of foam, are also within the scope of the present invention.

As would be understood by the persons having ordinary skill in the art, the various features of the different embodiments disclosed herein can be combined in a variety of ways to achieve the desired functionality based on variables such as the structure of the wheeled carrier or object to be transported, the weight of the load to be carried, and the terrain to be traversed. Further, material selection is important for desired functionality. By way of example, a unitary runner constructed of rigid material would be desirable for a conversion device for use with a wheelbarrow carrying a somewhat heavy load over gravel, while a dual runner constructed of fairly flexible material might be desirable for a conversion device for use with a small wagon carrying a light load over soft sand. Also, the size and shape of the bow can be configured based on the desired functionality. It is within the scope of this invention to mix and match various features, components and materials set forth herein to achieve the desired utility.

Certain structures and components are disclosed for purposes of describing an embodiment, and setting forth the best mode, but should not be construed as teaching the only possible embodiment. Rather, modifications may be made without departing from the spirit and scope of the invention as set forth in the following claims. It should be understood that all specifications, unless otherwise stated or contrary to common sense, are +/−10%, and that ranges of values set forth inherently include those values, as well as all increments between. Also, "substantially" as used herein, shall mean generally. By way of example a "substantially planar" surface includes surface imperfections but is generally planar.

What is claimed is:

1. A device for converting a wheeled carrier into a sliding carrier including:
    a. at least one sliding member including a leading edge, a dragging edge, and an upper surface therebetween;
    b. a means for attaching said leading edge to said upper surface, wherein said at least one sliding member defines a substantially teardrop shaped bow when said leading edge is attached to said upper surface;
    c. a wheel platform formed by said upper surface, said wheel platform for supporting at least one wheel; and
    d. an abutment adjacent said wheel platform, said abutment for arresting the forward rotation of said at least one wheel supported on said wheel platform.

2. The device of claim 1 wherein said sliding member is flexible.

3. The device of claim 2 wherein said sliding member is constructed of plastic.

4. The device of claim 2 wherein said sliding member defines at least one fold, said fold affecting the shape of said substantially teardrop shaped bow.

5. The device of claim 4 wherein said at least one fold is said abutment.

6. The device of claim 1 wherein said means for attaching said leading edge to said upper surface is selected from the group consisting of thermal bonding, glue, epoxy, rivets, bolts, screws, hook and loop fasteners, pin connectors, staples, snaps, buttons, insertion sleeves, clips, pegs with caps, and hook and eyelet fasteners, and combinations thereof.

7. The device of claim 1 further including a stabilizing member connected to said sliding member.

8. The device of claim 7 wherein said stabilizing member is positioned within said bow.

9. The device of claim 7 wherein said stabilizing member is positioned entirely outside said bow.

10. The device of 7 wherein said stabilizing member is said abutment.

11. The device of claim 1 wherein said at least one sliding member is exactly two sliding members, said two sliding members attached one to the other by a spanning bar.

12. The device of claim 1 further including a wheel stabilizer connected to said wheel platform.

13. The device of claim 12 wherein said wheel stabilizer is selected from the group consisting of a wheel housing, a stabilizing pad, and combinations thereof.

14. A sliding carrier system for traversing loose terrain including:
    a. a wheeled carrier including a first wheel engaged with a first axle; and
    b. a conversion device positioned under said first wheel, said conversion device including at least one sliding member defining a substantially teardrop shaped bow when a leading edge of said at least one sliding member is attached to an upper surface of said at least one sliding member.

15. The sliding carrier system of claim 14 further including a second wheel positioned on top of said conversion device.

16. The sliding carrier system of claim 14 wherein said first wheel does not substantially rotate around said first axle when said wheeled carrier traverses loose terrain.

17. The sliding carrier system of claim 14 wherein said wheeled carrier is selected from the group consisting of wagons, carts, rolling bags, wheelbarrows, hand trucks, dollies, wheelchairs, gurneys, rolling suitcases, rolling garbage cans and wheeled coolers.

18. The sliding carrier system of claim 14 wherein said wheeled carrier is not mechanically coupled to said conversion device.

19. A method of converting a wheeled carrier into a sliding carrier including the non-sequential acts of:
    a. positioning a wheeled carrier atop a conversion device, said conversion device including at least one sliding member defining a substantially teardrop shaped bow when a leading edge of said at least one sliding member is attached to an upper surface of said at least one sliding member;
    b. abutting at least one wheel of the wheeled carrier to the conversion device such that rotation of said at least one wheel is substantially impeded in a forward direction;
    c. exerting forward force on said wheeled carrier such that the sliding member slides along the terrain underneath thereby transporting the wheeled carrier atop and without substantial rotation of said at least one wheel.

* * * * *